US012620195B2

(12) United States Patent
Ravi Kumar et al.

(10) Patent No.: US 12,620,195 B2
(45) Date of Patent: May 5, 2026

(54) ROBUST FEATURE EXTRACTION FROM OCCLUDED IMAGE FRAMES FOR VEHICLE APPLICATIONS

(71) Applicant: QUALCOMM Incorporated, San Diego, CA (US)

(72) Inventors: Varun Ravi Kumar, San Diego, CA (US); Debasmit Das, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 18/321,520

(22) Filed: May 22, 2023

(65) Prior Publication Data

US 2024/0395007 A1 Nov. 28, 2024

(51) Int. Cl.
| | |
|---|---|
| *G06V 10/26* | (2022.01) |
| *G05D 1/00* | (2006.01) |
| *G06T 7/10* | (2017.01) |
| *G06V 10/80* | (2022.01) |
| *G06V 10/82* | (2022.01) |
| *G06V 20/56* | (2022.01) |

(52) U.S. Cl.
CPC ............. *G06V 10/26* (2022.01); *G05D 1/021* (2013.01); *G06T 7/10* (2017.01); *G06V 10/806* (2022.01); *G06T 2207/20081* (2013.01)

(58) Field of Classification Search
CPC ........ G06V 10/26; G06V 10/806; G06T 7/10; G06T 2207/20081; G05D 1/021
See application file for complete search history.

(56) References Cited

U.S. PATENT DOCUMENTS

2020/0204732 A1* 6/2020 Yadav ........................ B60R 1/27
2021/0150203 A1* 5/2021 Liu ............................ G06T 7/11

OTHER PUBLICATIONS

Hou, Weilong, et al. "Blind image quality assessment via deep learning." IEEE (2014) (Year: 2014).*
Bogdan Penkovsky, "Day 5: Convolutional Neural Networks Tutorial" penkovsky.com, published 2020 (Year: 2020).*
(Continued)

*Primary Examiner* — Ross Varndell
*Assistant Examiner* — Nhut Huy Pham
(74) *Attorney, Agent, or Firm* — Norton Rose Fulbright US LLP/QUALCOMM Incorporated

(57) ABSTRACT

This disclosure provides systems, methods, and devices for vehicle driving assistance systems that support image processing. In a first aspect, a method of image processing includes receiving a plurality of image frames by a computing device and using machine learning models to identify corrupted or occluded image frames. A first machine learning model may identify corrupted image frames, while a second machine learning model may identify partially occluded image frames. The method may further include generating updated versions of image frames captured by vehicle cameras, such as based on feature vectors from the first and second machine learning models. The feature vectors may be fused and provided to a third machine learning model to generate updated versions of occluded image frames. The method may further include determining vehicle control instructions based on the updated versions. Other aspects and features are also claimed and described.

25 Claims, 6 Drawing Sheets

(56) References Cited

OTHER PUBLICATIONS

Bogdan Penkovsky, "Day 1: Learning Neural Networks The Hard Way" penkovsky.com, published Jan. 28, 2023 (Year: 2023).*

Wang, Shengjie et al. "Bias also matters: Bias attribution for deep neural network explanation." International Conference on Machine Learning. PMLR, 2019 (Year: 2019).*

Hou, Weilong, et al. "Blind image quality assessment via deep learning." IEEE (Year: 2014).*

* cited by examiner

Machine Learning Model 500

Convolution Layer 502

Pooling Layer 504

MLP Layer 506

Sigmoid Function 508

Separable Convolution Layer 510

Top View Model 520

Camera Encoder Process 522

Camera Features 528

Top View Projection Process 524

Projected Camera Features 530

Decoder Model 526

Top View Segmentation Map 530

600

RECEIVE A PLURALITY OF IMAGE FRAMES
602

DETERMINE A FIRST SET OF IMAGE FRAMES THAT ARE CORRUPTED
604

DETERMINE A SECOND SET OF IMAGE FRAMES THAT ARE PARTIALLY OCCLUDED
606

DETERMINE UPDATED VERSIONS OF AT LEAST A SUBSET OF THE FIRST SET OF IMAGE FRAMES AND THE SECOND SET OF IMAGE FRAMES
608

DETERMINE VEHICLE CONTROL INSTRUCTIONS BASED ON THE UPDATED VERSIONS
610

ROBUST FEATURE EXTRACTION FROM OCCLUDED IMAGE FRAMES FOR VEHICLE APPLICATIONS

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

One aspect includes a method for image processing for use in a vehicle assistance system is provided that includes receiving a plurality of image frames. The method also includes determining, from among the plurality of image frames, a first set of image frames that are corrupted. The method also includes identifying, from among the plurality of image frames, a second set of image frames that are partially occluded. The method also includes determining updated versions of at least a subset of the first set of image frames and the second set of image frames. The method also includes determining vehicle control instructions based on the updated versions.

An additional aspect includes an apparatus that includes a memory storing processor-readable code and at least one processor coupled to the memory. The at least one processor may be configured to execute the processor-readable code to cause the at least one processor to perform operations including receiving a plurality of image frames; determining, from among the plurality of image frames, a first set of image frames that are corrupted; identifying, from among the plurality of image frames, a second set of image frames that are partially occluded; determining updated versions of at least a subset of the first set of image frames and the second set of image frames; and determining vehicle control instructions based on the updated versions.

Another aspect includes a non-transitory computer-readable medium storing instructions that, when executed by a processor, cause the processor to perform operations including receiving a plurality of image frames. The operations also include determining, from among the plurality of image frames, a first set of image frames that are corrupted. The operations also include identifying, from among the plurality of image frames, a second set of image frames that are partially occluded. The operations also include determining updated versions of at least a subset of the first set of image frames and the second set of image frames. The operations also include determining vehicle control instructions based on the updated versions.

A further aspect includes a vehicle that includes a memory storing processor-readable code and at least one processor coupled to the memory. The at least one processor configured to execute the processor-readable code to cause the at least one processor to perform operations including: receiving a plurality of image frames; determining, from among the plurality of image frames, a first set of image frames that are corrupted; identifying, from among the plurality of image frames, a second set of image frames that are partially occluded; determining updated versions of at least a subset of the first set of image frames and the second set of image frames; and determining vehicle control instructions based on the updated versions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
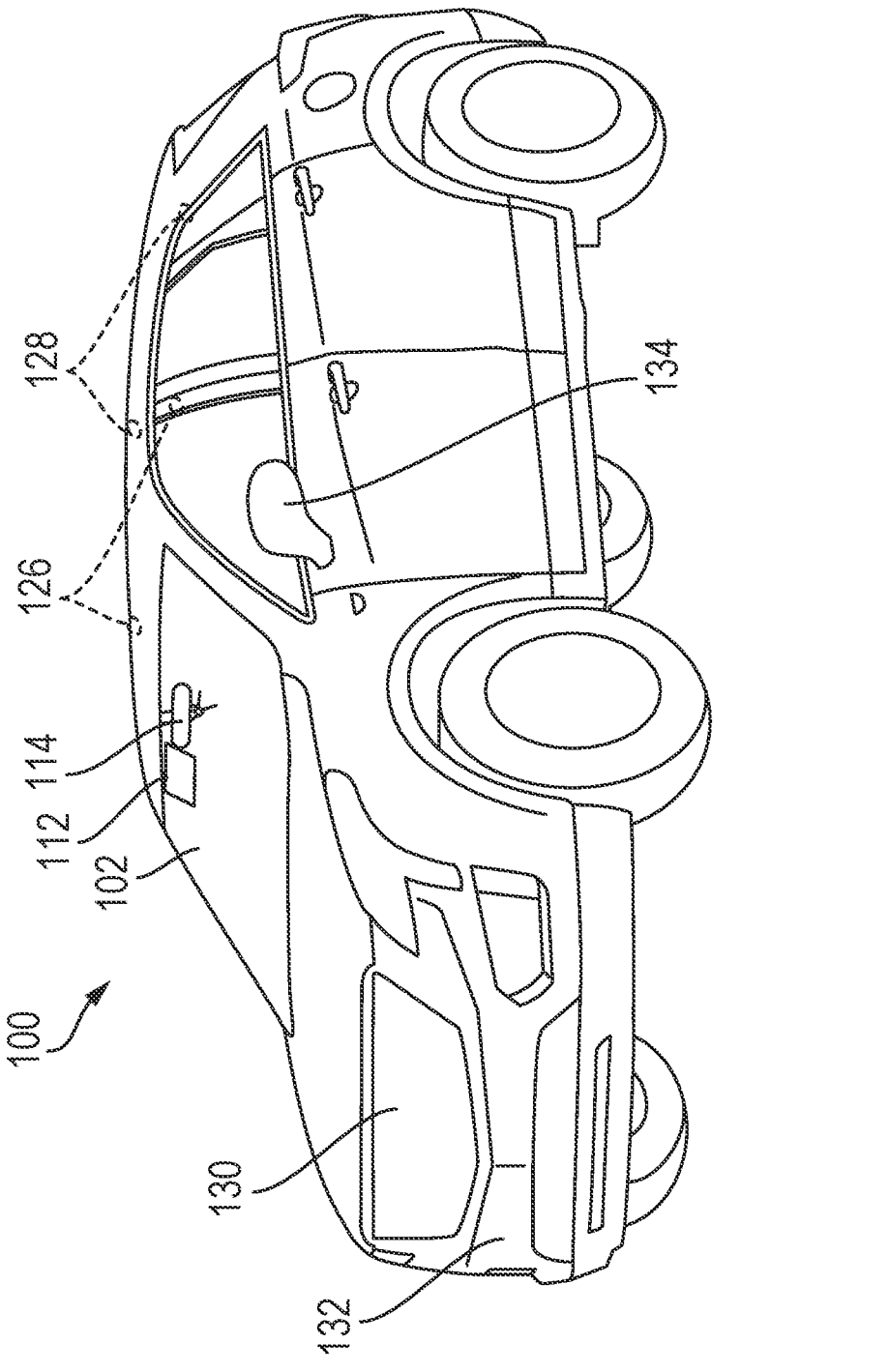
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

To monitor the area surrounding a vehicle, multiple views of the vehicle's surrounding area may be used. These views may include a perspective view from one or more cameras located on the vehicle. Additionally, top views, also known as birds eye views, provide a top-down view of the vehicle and its surroundings. Specifically, top view segmentation maps that distinguish between different objects in an environment may be used in vehicle applications to provide a 360-degree view of the surroundings. This technology utilizes cameras and sensors to create a detailed map of the area around the vehicle and can be used for navigation, parking assistance, collision avoidance, and other safety features. Top view segmentation maps may be determined based on perspective view image frames captured from cameras located on the vehicle (such as by transforming and combining multiple image frames into a top view of an area surrounding the vehicle).

However, cameras and vehicles may not always produce accurate or reliable image frames during operation. For example, cameras can be damaged, dirty, out of focus, blocked, or occluded in other ways. Such errors can lead to unavailable or inaccurate image frames, such as when objects are blocked. Furthermore, cameras that are dirty, occluded, or otherwise unreliable may change over time (such as during movement of the vehicle or objects surrounding the vehicle). When such image frames are used to determine segmentation maps or top view image frames, the resulting views may be inaccurate and contain misleading representations of objects that are partially occluded in one or more perspective view image frames. Therefore, there exists a need to detect and correct unreliable image frames in vehicle applications.

The present disclosure provides systems, apparatus, methods, and computer-readable media that support robust feature extraction from occluded image frames. One such solution is a robust image frame processing pipeline configured to detect and remove corrupted image frames and detect and correct partially occluded image frames. In one instance, a computing device may receive a plurality of image frames and use machine learning models to identify corrupted or occluded image frames. A first machine learning model identify corrupted image frames, while a second machine learning model may identify partially occluded image frames. The second machine learning model may be configured to use a relative convolution operation that applies a bias value to pixel values. Additionally, the computing device may generate updated versions of image frames (such as partially occluded image frames) captured by vehicle cameras. Feature vectors from the first and second machine learning models may be fused and provided to a third machine learning model (such as a generative model) to generate updated versions of occluded image frames. Vehicle control instructions may then be determined based on the updated versions, and object detection and segmentation tasks may be performed using updated versions of the image frames. In particular, these tasks may be performed by models (such as a top view model) that are trained to maintain consistency between features generated from non-corrupted image frames and features generated for updated versions of occluded image frames.

Stated differently, techniques are provided for improving the robustness of a pre-trained bird's eye view (BEV) model by addressing missing inputs resulting from the absence of certain cameras. To achieve explicit robustness, the model is modified using selection and completion models and a reconstruction model. The reconstruction model, also known as a view reconstructor, may be trained to reconstruct missing views and deployed as a pre-processing step before inputting camera views to a top view segmentation network. Implicit robustness is achieved by training objectives that make the representation of corrupted and non-corrupted inputs similar. To achieve this, a loss function may be added to ensure consistency between features/outputs of original inputs and corrupted inputs.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the provided techniques improve the accuracy of segmentation maps for areas surrounding a vehicle by reducing the impacts of corrupted images and correcting errors in partially occluded images. Furthermore, the provided techniques may reduce the processing time required to determine segmentation maps (such as by removing corrupted images from the processing pipeline before the images are used to determine segmentation maps and correcting occlusion errors in images before using the images to determine the segmentation map). This can reduce the computing resources required to determine segmentation maps, reduce power usage by onboard computing devices used to determine segmentation maps, improve segmentation map response times, or combinations thereof. The improved segmentation maps also improve the tracking of objects surrounding a vehicle, which can be used to determine more accurate and more responsive vehicle control instructions. One major benefit of improved tracking is that it allows vehicle control systems to more accurately navigate vehicles around obstacles. This can be particularly useful in situations where there may be unexpected obstructions or road conditions that could pose a hazard to drivers. Additionally, improved tracking can help to improve overall safety on the roads by reducing vehicle collisions. With better tracking capabilities, vehicles can be made more responsive to nearby obstacles and can be routed around detected obstacles more efficiently. These improvements can also extend to driver assistance systems, which can benefit from increased monitoring capabilities. By expanding the number, type, and variety of surrounding vehicles that can be detected, these systems can offer more accurate alerts and assistance to drivers when necessary, without generating unnecessary notifications or distractions.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or in a forward direction. In some embodiments, an additional camera may be located at the rear of the vehicle 100 and oriented such that the field of view of the additional camera captures a scene behind the vehicle 100 in the direction that the vehicle 100 is moving when in reverse mode or in a reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the vehicle 100 is traveling in a forward direction may likewise be obtained while the vehicle 100 is traveling in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
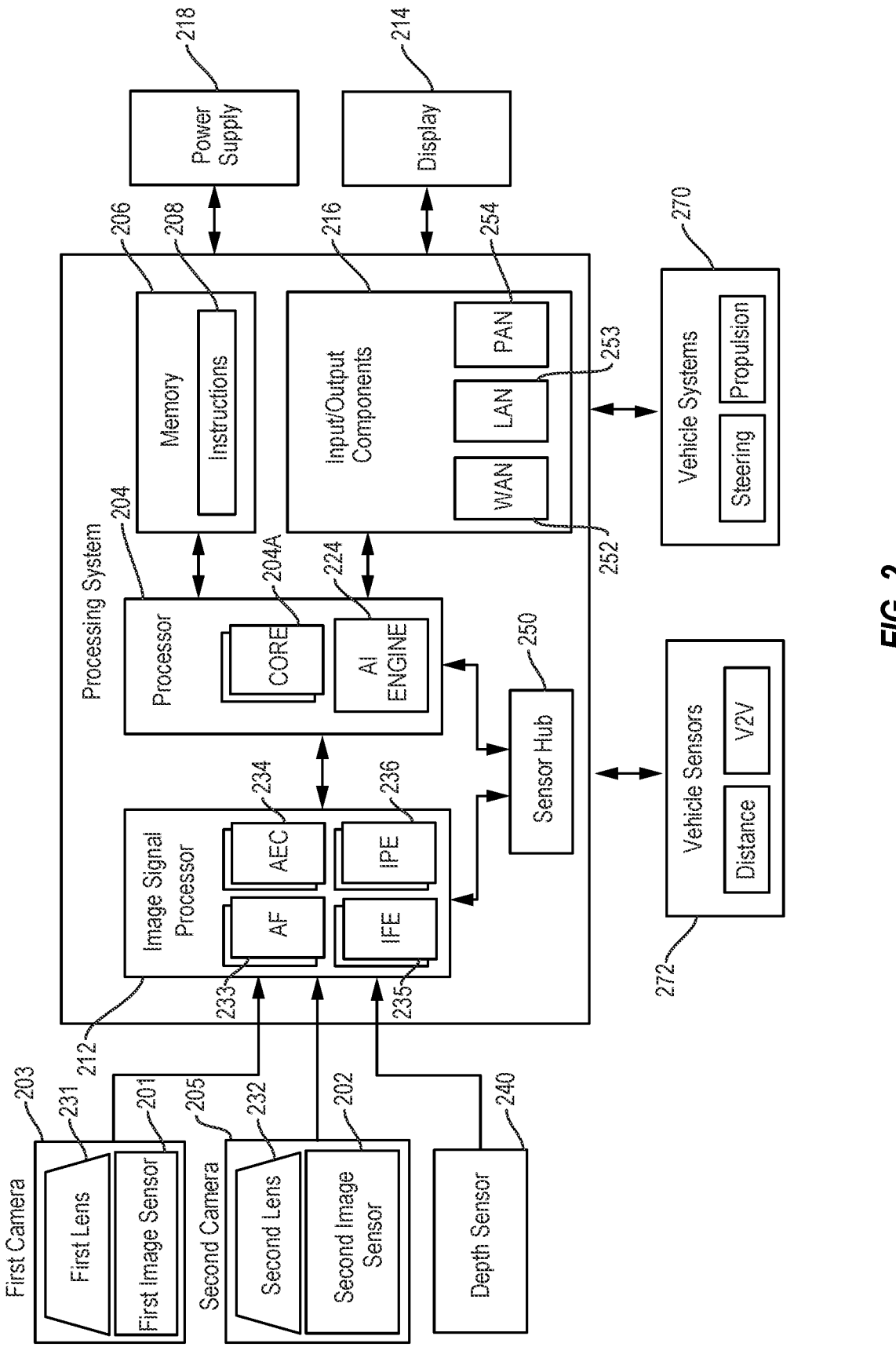
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206. As another example, the processor 204 may include one or more application processors configured to execute instructions stored in the memory 206 to determine images that are corrupted, determine images that are partially occluded, determine updated versions of the partially occluded images, and determine vehicle control instructions (such as based at least in part on the updated versions of the partially occluded images).

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
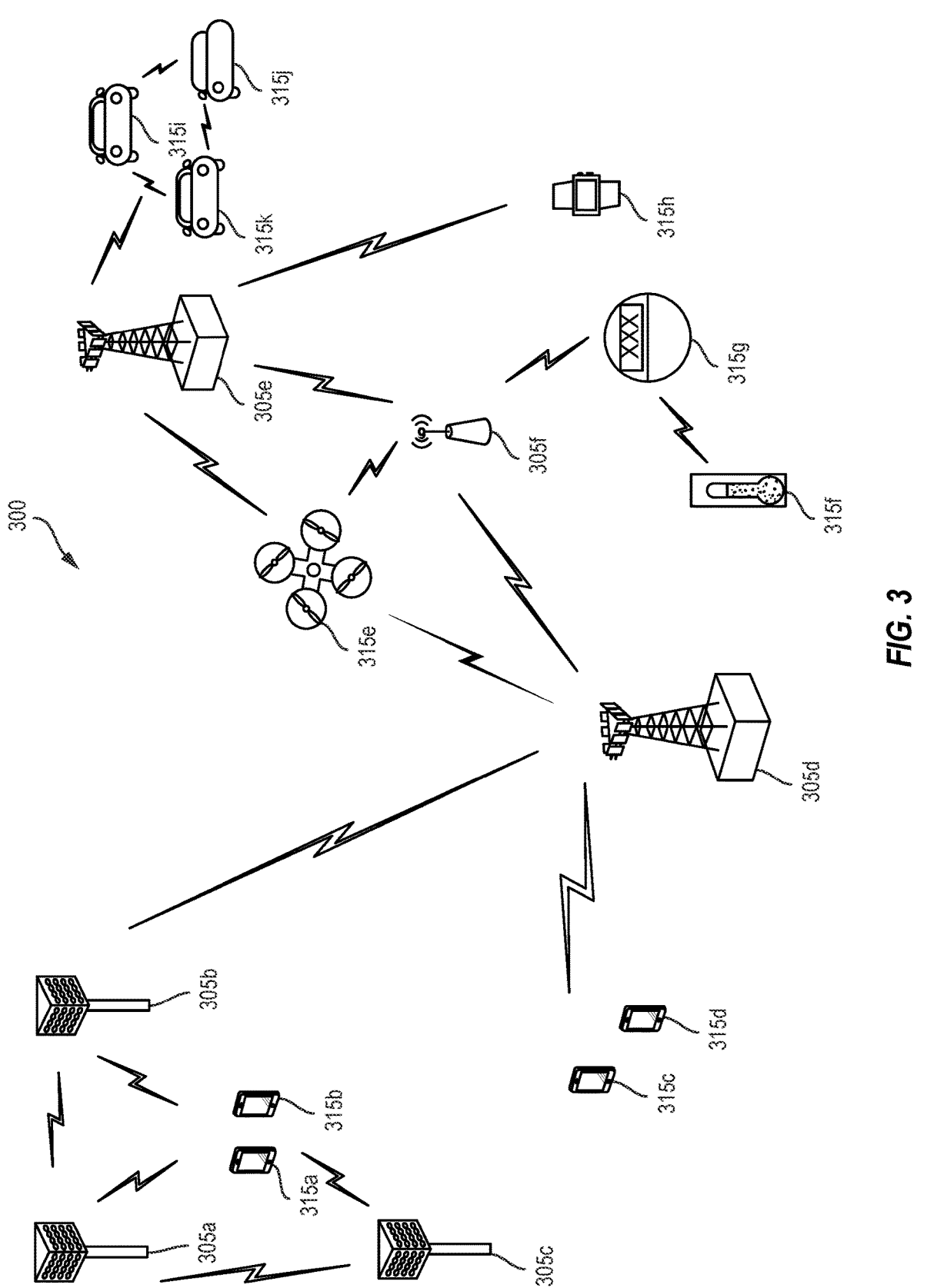
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f* is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315a-j are specifically shown as vehicles, a vehicle may employ the communication configuration described with reference to any of the UEs 315a-315k.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315a-315d of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315c-315k illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305a-305c serve UEs 315a and 315b using 3D beamforming and coordinated spatial techniques, such as coordinated multipoint (CoMP) or multi-connectivity. Macro base station 305d performs backhaul communications with base stations 305a-305c, as well as small cell, base station 305f. Macro base station 305d also transmits multicast services which are subscribed to and received by UEs 315c and 315d. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315e, which is a drone. Redundant communication links with UE 315e include from macro base stations 305d and 305e, as well as small cell base station 305f. Other machine type devices, such as UE 315f (thermometer), UE 315g (smart meter), and UE 315h (wearable device) may communicate through wireless network 300 either directly with base stations, such as small cell base station 305f, and macro base station 305e, or in multi-hop configurations by communicating with another user device which relays its information to the network, such as UE 315f communicating temperature measurement information to the smart meter, UE 315g, which is then reported to the network through small cell base station 305f. Wireless network 300 may also provide additional network efficiency through dynamic, low-latency TDD communications or low-latency FDD communications, such as in a vehicle-to-vehicle (V2V) mesh network between UEs 315i-315k communicating with macro base station 305c.

Figure 4:
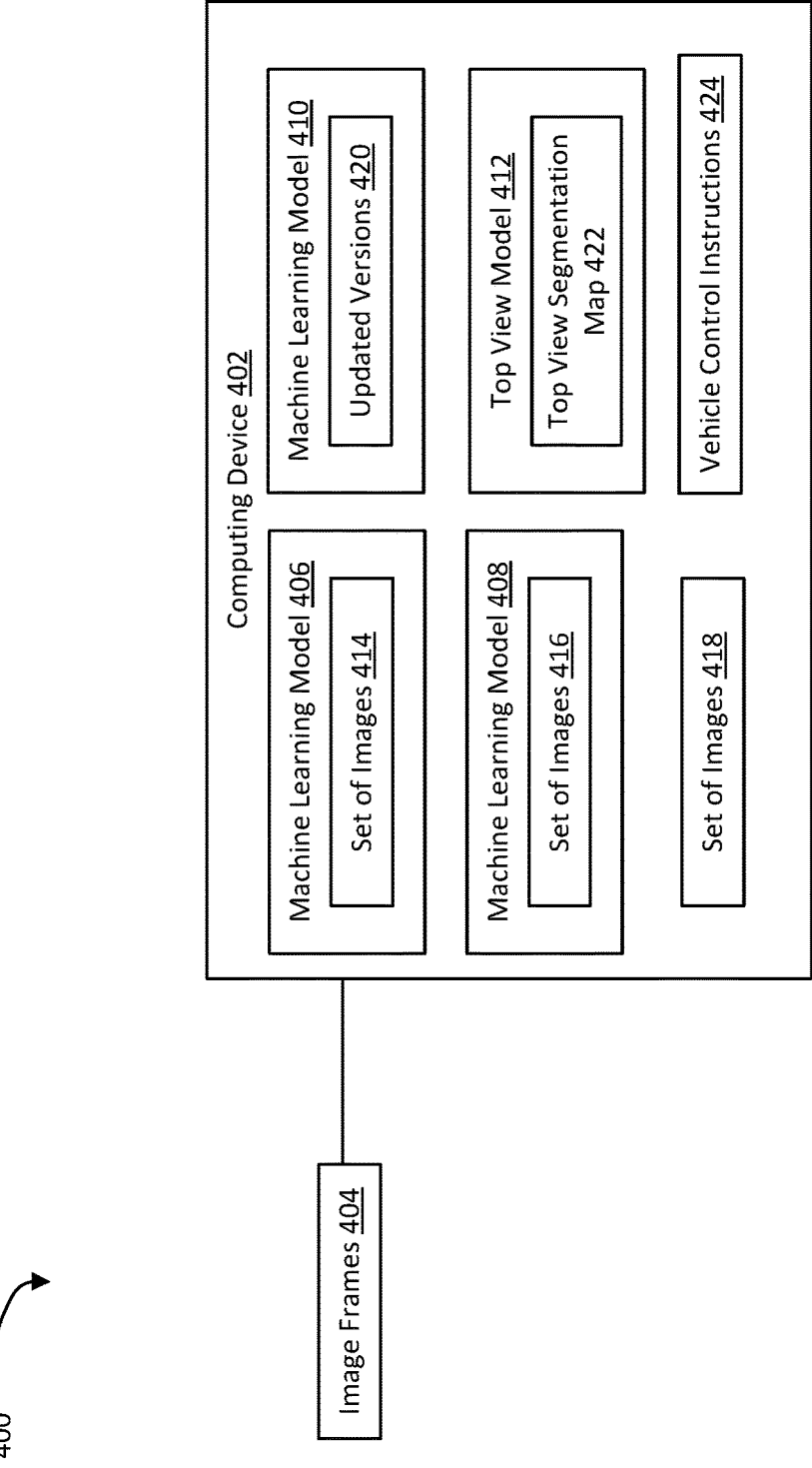
FIG. 4 is a block diagram illustrating robust feature extraction from occluded image frames according to one or more aspects of the disclosure.

Aspects of the vehicular systems described with reference to, and shown in, FIG. 1, FIG. 2, and FIG. 3 may include robust feature extraction from occluded image frames. For example, FIG. 4 is a block diagram illustrating a system 400 for robust feature extraction from occluded image frames according to an exemplary embodiment of the present disclosure. The system 400 includes an image frames 404 and a computing device 402. The computing device 402 includes a first machine learning model 406, a second machine learning model 408, a third set of image frames 418, a third machine learning model 410, a top view model 412, and vehicle control instructions 424. The first machine learning model 406 includes a first set of image frames 414, the second machine learning model 408 includes a second set of image frames 416, and the third machine learning model 410 includes updated versions 420. The top view model 412 includes a top view segmentation map 422. The system 400 may be an exemplary implementation of one or more above-discussed aspects. For example, the system 400 may be contained within the vehicle 100, may be an exemplary implementation of the processing system in FIG. 2 (such as the ISP 212, the processor 204, or combinations thereof), and the like.

The computing device 402 may be configured to receive a plurality of image frames 404. In certain implementations, the received image frames 404 may be captured from an area around a vehicle. For example, the vehicle may be equipped with one or more cameras. These cameras may be configured to capture images on a regular basis. The captured images may cover a wide range of angles and distances, providing a comprehensive view of the area around the vehicle. In certain implementations, the image frames 404 may include a single image that has been captured by a single camera. In other implementations, the image frames 404 may include multiple image frames that have been captured by a single camera, such as a stream of image frames 404 captured by the camera. In additional or alternative implementations, the image frames 404 may include multiple image frames that have been captured by multiple cameras, such as multiple cameras facing different portions of an area surrounding the vehicle.

The computing device 402 may be configured to determine, from among the plurality of image frames 404, a first set of image frames 414 that are corrupted. In certain implementations, the first set of image frames 414 may include image frames 404 that are corrupted, obstructed, or are otherwise unavailable for image frame recognition purposes. This can include issues such as missing data, image distortion, viewpoints that are completely or mostly blocked, or interference from other sources, all of which can impact the accuracy of computer vision techniques. For example, image frames may be missing from a sequence of image frames 404, image frames may be completely blocked (such as by dirt or other obstructions on a camera lens), image frames may be blurry or out of focus, or combinations thereof.

Figure 5A:
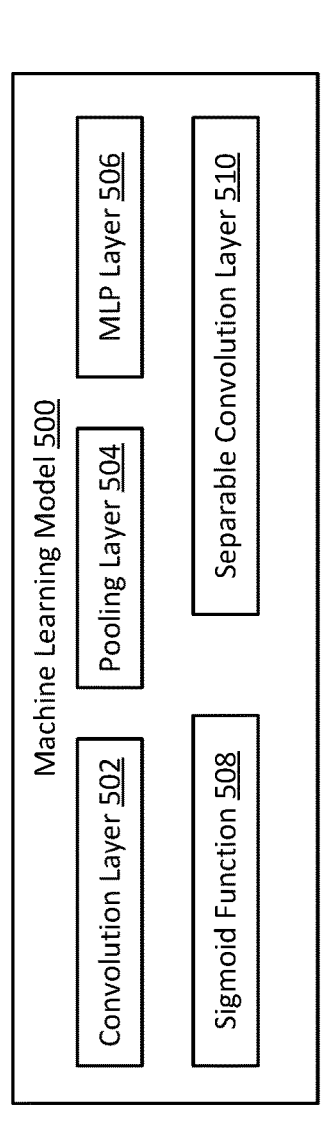
FIGS. 5A-5B are block diagrams illustrating models according to one or more aspects of the disclosure.

In certain implementations, the first set of image frames 414 are determined using a first machine learning model 406. In certain implementations, the first machine learning model 406 determines the first set of image frames 414 based on predicted probabilities that the first set of image frames 414 are corrupted. In certain implementations, the first machine learning model 406 may determine the first set of image frames 414 as image frames from among the plurality of image frames 404 with predicted probabilities greater than or equal to a threshold (such as 60%, 80%, 90%, 95%, and the like). In certain implementations, the first machine learning model 406 may include a multi-layer perceptron (MLP) layer configured to determine the predicted probabilities. For example, FIG. 5A depicts a first machine learning model 500 according to an exemplary embodiment of the present disclosure. The first machine learning model 500 may be an exemplary implementation of the first machine learning model 406. The first machine learning model 500 includes a convolution layer 502, a pooling layer 504, an MLP layer 506, a sigmoid function 508, and a separable convolution layer 510. In certain implementations, the MLP layer 506 may be configured to determine predicted probabilities that image frames 404 are corrupted based on feature vectors for the plurality of image frames 404. In certain implementations, the MLP layer 506 may be configured to receive feature vectors for multiple image frames 404 and to determine predicted probabilities that the multiple image frames 404 are corrupted. For example, the MLP layer 506 may receive feature vectors (such as pooled, one-dimensional feature vectors) for each of at least a subset of the image frames 404. In one specific implementation, the received image frames 404 may be a sequence of image frames 404, and the MLP layer 506 may receive feature vectors for each of a predetermined number of preceding image frames 404 (such as the last 3 image frames, the last 5 image frames, the last 10 image frames, and the like). In certain implementations, the MLP layer 506 may then determine predicted probabilities for corresponding image frames 404 based on the received feature vectors. In particular, the MLP layer 506 may be implemented as a neural network configured to predict image frame corruption.

In certain implementations, the first set of image frames 414 may then be selected based on the predicted probabilities. In certain implementations, the first set of image frames 414 may be selected using a sigmoid function 508 that maps received input values (such as received probabilities from the MLP layer) to a value between 0 and 1 indicating whether the image is corrupted (such as corresponding to a value of "1"). For example, the sigmoid function 508 may be implemented as a logistic function that receives predicted probabilities and selects image frames 404 that are corrupted based on the received probabilities.

In certain implementations, the first machine learning model 500 may further include a convolution layer 502 and a pooling layer 504 configured to determine the feature vectors. In certain implementations, the convolution layer 502 may be configured to determine one or more feature vectors for received image frames 404 (such as at least a subset of the plurality of image frames 404). For example, the computing device 402 may use the convolution layer 502 to determine a feature vector for each of at least a subset of the received image frames 404. In certain implementations, feature vectors for image frames 404 may include numerical representations of various aspects of an image frame. Some examples of features include color histograms, texture descriptors, edge detection, and shape analysis. Color histograms may quantify the distribution of colors in an image frame, while texture descriptors may capture patterns such as roughness or smoothness. Edge detections may identify boundaries between objects in an image frame, while shape analysis may identify or otherwise distinguish different types of objects based on geometric properties of the object within the image frame. In certain implementations, feature vectors may be single-dimensional, such as an N×1 vector, where N may be the number of features. In additional or alternative implementations, feature vectors may be multi-dimensional, such as an N×M×O vector, where at least two of N, M, and O are greater than 1.

In certain implementations, the pooling layer 504 may be configured to combine one or more features of the convolution layer 502 into an one-dimensional vector. In certain implementations, combining the one or more features may include one or more of averaging the features, taking maximum values of the features, taking minimum values of the features, concatenating the features, removing one or more features, or combinations thereof. One skilled in the art may appreciate additional techniques that may be used to combine features from feature vectors, and all such techniques are considered within the scope of the present disclosure. In certain implementations, the first machine learning model 406 may be configured to output an indication of the first set of image frames 414 (such as a one-hot encoded vector identifying which of the plurality of image frames 404 are corrupted). Additionally or alternatively, the first machine learning model 406 may be configured to output an indication of image frames 404 that are not corrupted.

In certain implementations, the first machine learning model 406 may be further configured to apply a separable convolution operation to each of the first set of image frames 414. In such instances, the output from the first machine learning model 406 may include copies of feature vectors for the selected images after the separable convolution operation is applied. In certain implementations, the separable convolution operation may be implemented as a convolution that decomposes a 2D kernel into two separate convolutions: a depth-wise convolution and a point-wise convolution. This implementation may enable the separable convolution operation to handle variable input channel sizes, such as different numbers of selected views for the first set of image frames 414. The separable convolution operation may have a fixed input channel size that may be applied separately to each of the first set of image frames 414. For example, the separable convolution may include a flat filter that is separately applied to each of the first set of image frames 414. This ensures consistency across all inputs while still allowing for flexibility in selecting which views are included.

The computing device 402 may be configured to identify, from among the plurality of image frames 404, a second set of image frames 416 that are partially occluded. In certain implementations, the second set of image frames 416 may include image frames 404 that are only partly corrupted or otherwise obstructed. For example, only a portion or particular region of an image frame may be blocked, blurry, out of focus, or combinations thereof.

In certain implementations, the second set of image frames 416 are determined using a second machine learning model 408. In certain implementations, the second machine learning model 408 may include a relative convolution operation that applies a bias value to pixel values while determining the convolution value. In certain implementations, the bias value may be determined based on pixel values within the convolution window. In certain implementations, during each convolution step, a convolution operation may be set up to calculate a convolution value for a corresponding pixel within a current image frame being processed. This may include determining a weighted combination of values within a convolution window, which may vary in size (such as a 3×3 pixel window, a 5×5 pixel window, etc.). While computing the weighted combination, the relative convolution operation may further apply the bias value to the pixel values. For example, a conventional convolution operation may be implemented as:

$$O = \sum_{i,j} X_{ij} W_{ij}$$

where:

O is the convolution value for a particular pixel location, $X_{ij}$ is the pixel value at location (i, j) within a convolution window for the particular pixel location, and $W_{ij}$ is a weight for the pixel value at location (i, j) within the convolution window for the particular pixel location.

By contrast, in one implementation, the relative convolution operation may be implemented as:

$$O_{rel} = \sum_{i,j} (X_{ij} - X_0) W_{ij}$$

where:

$O_{rel}$ is the relative convolution value for a particular pixel location, $X_{ij}$ is the pixel value at location (i, j) within a convolution window for the particular pixel location, $W_{ij}$ is a weight for the pixel value at location (i, j) within the convolution window for the particular pixel location, and $X_O$ is the bias value for the convolution window.

In certain implementations, the bias value may be determined based on pixel values within the current compilation window (such as maximum pixel values, minimum pixel values, median pixel values, average pixel values, and the like). Additionally or alternatively, the bias value may be determined based on pixels located within the current image frame, but outside of the convolution window. In still further implementations, the computing device 402 may also be configured to determine bias value the bias value based on values separate from the current image frame (such as pixel values from other image frames 404, a common bias value for multiple image frames, and the like). Based on the present disclosure, one skilled in the art may recognize many possible ways to determine bias values for relative convolution operations. All such implementations are considered within the scope of the present disclosure.

The second machine learning model 408 may determine partially occluded image frames based on convolutions for the image frames 404. For example, after applying the relative convolution to the image frames 404, areas within the image frames that are potentially occluded may have outlier values (such as higher than normal values, lower than normal values), depending on the choice of bias value. In certain implementations, the second machine learning model 408 may identify image frames with more than a predetermined threshold of outlier values as being partially occluded. For example, the predetermined threshold may include more than a predetermined quantity of pixels with an outlier value, more than a certain percentage of the image frame with an outlier value, or combinations thereof. In certain implementations, the second machine learning model 408 may be configured to output identifiers of the second set of image frames 416. Additionally or alternatively, the second machine learning model 408 may be configured to output identifiers of occluded regions of the second set of image frames 416 (such as a mask of the second set of image frames 416 identifying occluded regions according to the determined relative convolution values). In certain implementations, the output from the second machine learning model 408 may be a feature vector for each of the second set of image frames 416.

The computing device 402 may be configured to determine updated versions 420 of at least a subset of the first set of image frames 414 and the second set of image frames 416. In certain implementations, the updated versions 420 are determined by a third machine learning model 410 configured to generate updated versions 420 of the second set of image frames 416 based on selected image frames 404. In certain implementations, the third machine learning model 410 may be implemented as a generative model trained to replace or otherwise fill in missing image frame portions (such as occluded portions of image frames identified by the second machine learning model 408). In certain implementations, the third machine learning model 410 may be configured to receive fused feature vectors determined based on the first set of image frames 414 and the second set of image frames 416. In certain implementations, the fused feature vectors are determined based on the output of both the first machine learning model 406 and the second machine learning model 408. For instance, features extracted from non-corrupted image frames 404 may be combined with features from the second set of image frames 416. In certain implementations, fusing the feature vectors may include concatenating multiple feature vectors to form a single, fused feature vector. In certain implementations, the computing device 402 may replace at least a subset of the second set of image frames 416 with updated versions 420 and may not replace the first set of image frames 414. Instead, the computing device 402 may be configured to determine the updated versions 420 based on image frames that are not corrupted or excluded (such as image frames from the received image frames 404 that are not contained in the first set of image frames 414 or the second set of image frames 416). For example, the computing device 402 may exclude the first set of image frames 414 from consideration for determining the updated versions 420. In particular, the computing device 402 may determine feature vectors for a third set of image frames 418 that exclude the first set of image frames 414 and the second set of image frames 416. Feature vectors for the third set of image frames 418 may be fused with feature vectors for the second set of image frames 416 and may be provided to the third machine learning model 410. In such instances, the third machine learning model 410 may be configured to determine the updated versions 420 of the second set of image frames 416 to replace the occluded portions of the second set image frames 416 based on the feature vectors for the third set of image frames 418.

For example, the models 406, 408, 410, 412 may be implemented as one or more machine learning models, including supervised learning models, unsupervised learning models, other types of machine learning models, and/or other types of predictive models. For example, the models 406, 408, 410, 412 may be implemented as one or more of a neural network, a transformer model, a decision tree model, a support vector machine, a Bayesian network, a classifier model, a regression model, and the like. The training data sets may specify one or more expected outputs. Parameters of the models 406, 408, 410, 412 may be updated based on whether the models 406, 408, 410, 412 generates correct outputs when compared to the expected outputs. In particular, the models 406, 408, 410, 412 may receive one or more pieces of input data from the training data sets that are associated with a plurality of expected outputs. The models 406, 408, 410, 412 may generate predicted outputs based on a current configuration of the models 406, 408, 410, 412. The predicted outputs may be compared to the expected outputs and one or more parameter updates may be computed based on differences between the predicted outputs and the expected outputs. In particular, the parameters may include weights (e.g., priorities) for different features and combinations of features. The parameter updates the models 406, 408, 410, 412 may include updating one or more of the features analyzed and/or the weights assigned to different features or combinations of features (e.g., relative to the current configuration of the models 406, 408, 410, 412).

More specifically, the first machine learning model 406 may be trained based on a one-hot encoding of known corrupted image frames within a training dataset. In certain implementations, the known corrupted image frames may be manually generated such as by manually blurring, obscuring, or removing image frames. In additional or alternative implementations, the known corrupted image frames may be selected from real-world image frames that are identified (such as manually identified, automatically identified, or combinations thereof) as containing corrupted image frames. Training the first machine learning model 406 may include training the MLP layer 506 (such as by adjusting one or more features, nodes, or other aspects of the MLP layer 506). Additionally or alternatively, training the first machine learning model 406 may include adjusting the sigmoid function 508 (such as the cutoff threshold for identifying a corrupted image frame, one or more parameters of how the sigmoid function 508 computes output values, and the like).

In certain implementations, the second machine learning model 408 may be trained based on a training dataset containing training image frames that are known to be partially occluded. In certain implementations, the training data set for the second machine learning model 408 may contain training image frames 404 that were manually created to be partially occluded (such as by manually overlaying or distorting portions of the image frames 404). Additionally or alternatively, the training data set for the second machine learning model 408 may contain real world image frames 404 that were identified as being partially included (such as manually identified, automatically identified, or combinations thereof).

In certain implementations, the third machine learning model 410 may be trained based on comparisons between updated versions 420 of the known occluded image frames 404 and original, non-occluded versions of those image frames 404. For example, where the known occluded image frames 404 are manually created by including otherwise clear image frames 404, the original clear image frames 404 may be compared to the updated versions 420 determined by the third machine learning model 410, and the third machine learning model 410 may be updated as noted above based on differences between the original clear image frames 404 and the updated versions 420. In certain implementations, two or more of the first machine learning model 406, the second machine learning model 408, and the third machine learning model 410 may be trained in parallel.

The computing device 402 may be configured to determine vehicle control instructions 424 based on the updated versions 420. In certain implementations, vehicle control instructions may refer to the set of commands and guidelines that directly or indirectly regulate the movement of a vehicle. These instructions may come in the form of direct vehicular control instructions, such as steering, braking, accelerating or combinations thereof. In additional or alternative implementations, vehicle control instructions may be supplementary instructions that support driver assistance programs, such as obstacle avoidance, blind spot monitoring, and other driver assistance alerts. control instructions may accordingly help drivers to maintain safe operation of vehicles while driving on roads and highways.

In certain implementations, the updated versions 420 may be combined with other image frames 404 from the plurality of image frames 404 (such as image frames 404 that were not identified in the first set or the second set). In certain implementations, a third set of image frames 418 that excludes the first set of image frames 414 and the second set of image frames 416 may be combined with the updated versions 420 of the second set of image frames 416 to form a combined set of image frames 404 (such as image frames 404 for a current period in time). The combined set of image frames 404 may then be used to determine the vehicle control instructions 424. For example, the computing device 402 may perform one or more object detection tasks, segmentation tasks, navigation tasks, and the like.

Figure 5B:
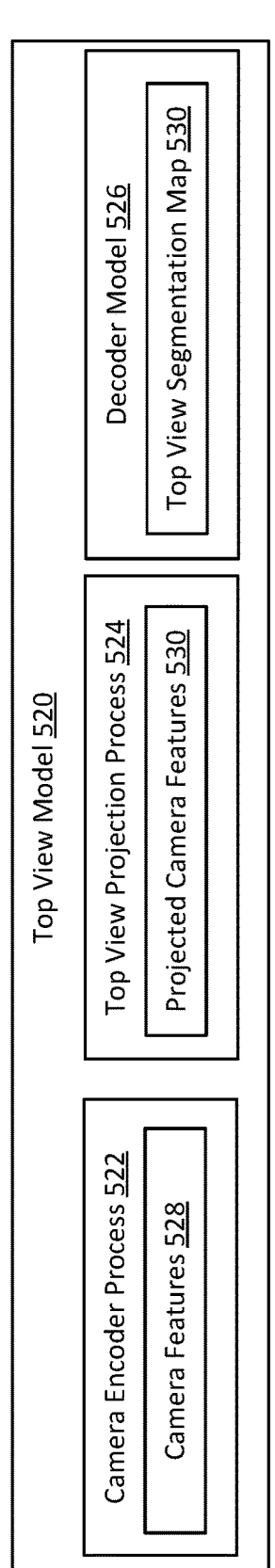

In one particular implementation, a top view segmentation map 422 may be determined based on the combined set of image frames, and may be used to determine the vehicle control instructions 424 (such as by identifying one or more obstacles, other vehicles, road markings, traffic signals, and the like within the environment surrounding the vehicle). For example, the top view model 412 may be trained to determine top view segmentation maps 422 based on received images (such as received feature vectors for one or more received images). For example, FIG. 5B depicts a top view model 520 according to an exemplary embodiment of the present disclosure. In particular, the top view model 520 may be an exemplary implementation of the models 412. The top view model 520 includes a camera encoder process 522, a top view projection process 524, a decoder model 526. The camera encoder process 522 includes camera features 528, the top view projection process 524 includes projected camera features 530, and the decoder model 526 includes a top view segmentation map 532. The camera encoder process 522 may be configured to receive images, such as the third set of images 418 and the updated versions 420 and may generate camera features 528 based on the received images. In certain implementations, the camera encoder process 522 may receive feature vectors for the images and may determine camera features based on the received feature vectors. Camera features 528 may include features of the camera or image sensor that captured the images, such as resolution, focal length, aperture, shutter speed, and the like. Additionally or alternatively, camera features 528 may include features of the images, such as edges, color histograms, texture analysis, object detection, and the like. The top view projection process 524 may be configured to receive the camera features 528 and to determine projected camera features 530 based on the camera features 528. For example, the top view projection process 524 may project locations of features within the camera features 528 to corresponding locations within a top-down view of an area surrounding the vehicle. The decoder model 526 may be configured to receive the projected camera features 530 and to determine a top view segmentation map 532 (which may be an exemplary implementation of the top view segmentation map 422). As noted above, the top view segmentation map 532 may identify particular objects, road markings, pedestrians, vehicles, and other obstacles or aspects of the environment surrounding the vehicle.

In certain implementations, the top view model 412 may be trained to maintain consistency between (i) features generated based on non-corrupted image frames and (ii) features generated for the updated versions 420. Such training may ensure that the updated versions 420 determined by the second machine learning model 408 are processed similarly to original image frames received from cameras. In particular, the top view model 412 may be trained based on at least one consistency measure, including a loss equation that produces consistency between features identified within original input image frames (such as the third set of image frames 418) and updated version of occluded image frames (such as updated versions 420 of the second set of image frames 416). In certain implementations, the consistency measure may be selected from the group consisting of a mean absolute error loss measure (L1 loss measure) between outputs from one or more processes of the top view model 412, an L1 loss between feature probabilities from one or more processes of the top view model 412, a mean squared error loss measure (L2 loss measure) between outputs from one or more processes of the top view model 412, an L2 loss between feature probabilities from one or more processes of the top view model 412, and a Kullback-Leibler (KL) divergence between feature probabilities from one or more processes of the top view model 412. For example, one or more aspects of the top view model 520 may be trained to ensure consistency between features for updated and non-corrupted images. As a specific example, one or more of the above consistency measures may be added to the training functions for the top view projection process 524 and the decoder model 526.

Figure 6:
FIG. 6 is a flow chart illustrating an example method for robust feature extraction from occluded image frames according to one or more aspects of the disclosure.
Figure 6:
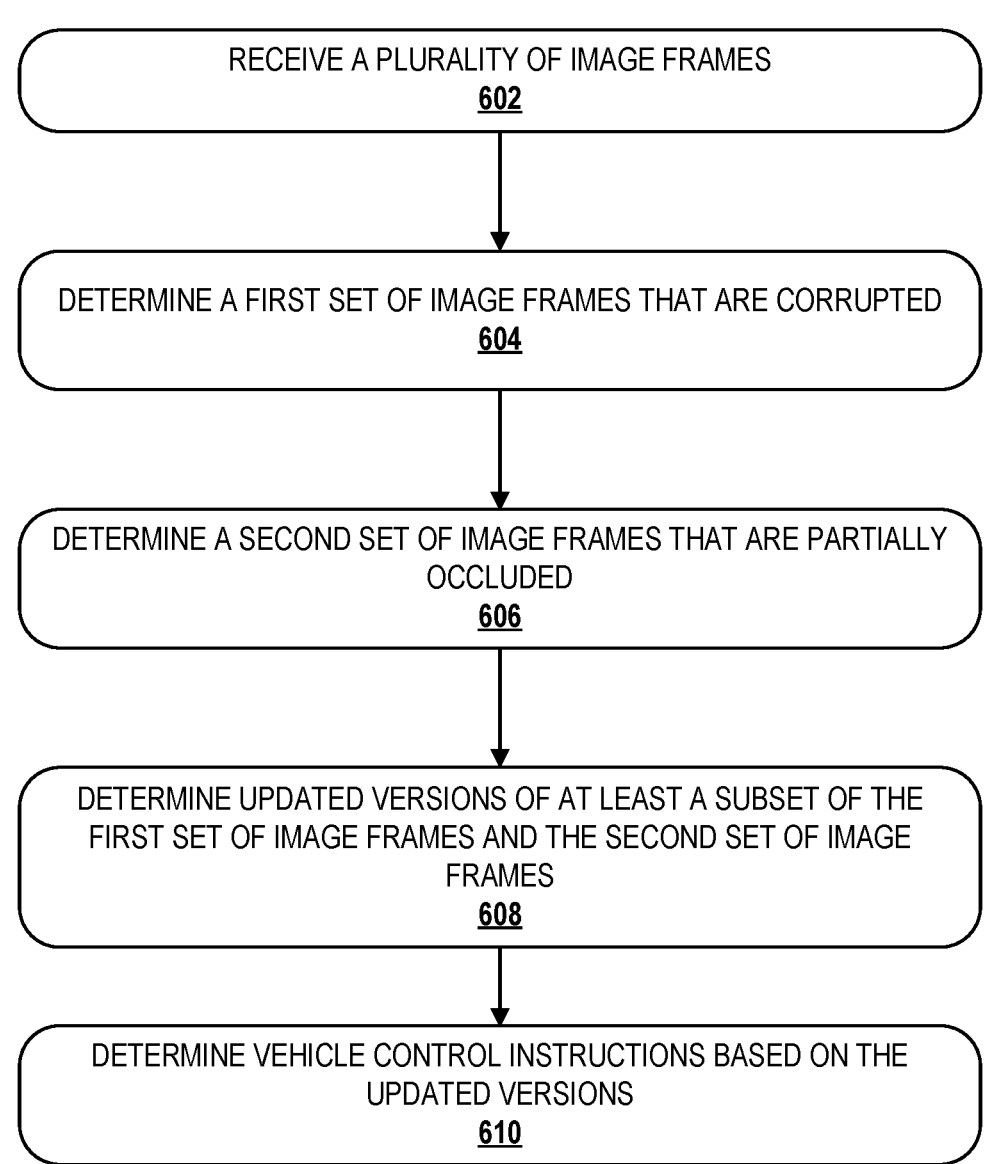

One method of performing image processing according to embodiments described above is shown in FIG. 6. FIG. 6 is a flow chart illustrating an example method 600 for robust feature extraction from occluded image frames. The method may be performed by one or more of the above systems, such as the systems 100, 200, 300, 400.

The method 600 includes receiving a plurality of image frames (block 602). For example, the computing device 402 may receive a plurality of image frames 404 captured by cameras located on a vehicle.

The method 600 includes determining, from among the plurality of image frames, a first set of image frames that are corrupted (block 604). For example, the computing device 402 may determine, from among the plurality of image frames 404, a first set of image frames 414 that are corrupted. In certain implementations, the first set of image frames 414 may include image frames that are corrupted, obstructed, or are otherwise unavailable for image frame recognition purposes. In certain implementations, the first set of image frames 414 are determined using a first machine learning model 406. In certain implementations, the first machine learning model 406 determines the first set of image frames 414 based on predicted probabilities that the first set of image frames 414 are corrupted. In certain implementations, the first machine learning model 406 may include a multi-layer perceptron (MLP) layer configured to determine the predicted probabilities. In certain implementations, the MLP layer may be configured to determine predicted probabilities that image frames are corrupted based on feature vectors for the plurality of image frames 404. In certain implementations, the first set of image frames 414 may then be selected based on the predicted probabilities. In certain implementations, the first set of image frames 414 may be selected using a sigmoid function. In certain implementations, the first machine learning model 406 may further include a convolution layer 502 and a pooling layer 504 configured to determine the feature vectors. In certain implementations, the convolution layer 502 may be configured to determine one or more feature vectors for received image frames 404 (such as at least a subset of the plurality of image frames 404). In certain implementations, the pooling layer 504 may be configured to combine one or more features of the convolution layer 502 into a one-dimensional vector. In certain implementations, the first machine learning model 406 may be configured to output an indication of the first set of image frames 414 (such as a one-hot encoded vector identifying which of the plurality of image frames 404 are corrupted). Additionally or alternatively, the first machine learning model 406 may be configured to output an indication of image frames 404 that are not corrupted. In certain implementations, the first machine learning model 406 may be further configured to apply a separable convolution operation to each of the first set of image frames 414.

The method 600 includes identifying, from among the plurality of image frames, a second set of image frames that are partially occluded (block 606). For example, the computing device 402 may identify, from among the plurality of image frames 404, a second set of image frames 416 that are partially occluded. In certain implementations, the second set of image frames 416 may include image frames that are only partly corrupted or otherwise obstructed. In certain implementations, the second set of image frames 416 are determined using a second machine learning model 408. In certain implementations, the second machine learning model 408 may include a relative convolution operation that applies a bias value to pixel values while determining the convolution value.

The method 600 includes determining updated versions of at least a subset of the first set of image frames and the second set of image frames (block 608). For example, the computing device 402 may determine updated versions 420 of at least a subset of the first set of image frames 414 and the second set of image frames 416. In certain implementations, the updated versions 420 are determined by a third machine learning model 410 configured to generate updated versions 420 of the second set of image frames 416 based on selected image frames, such as the third set of image frames 418. In certain implementations, the third machine learning model 410 may be implemented as a generative model trained to replace or otherwise fill in missing image frame portions (such as occluded portions of image frames captured from cameras located on vehicles). In certain implementations, the third machine learning model 410 may be configured to receive fused feature vectors determined based on the first set of image frames 414 and the second set of image frames 416 (such as features of the second set of image frames 416 and the third set of image frames 418). In certain implementations, the third machine learning model 410 may be configured to determine the updated versions 420 of the second set of image frames 416 to replace the occluded portions of the image frames based on the feature vectors for the third set of image frames 418.

The method 600 includes determining vehicle control instructions based on the updated versions (block 610). For example, the computing device 402 may determine vehicle control instructions 424 based on the updated versions 420. In certain implementations, the updated versions 420 might be combined with other image frames from the plurality of image frames 404. For example, the third set of image frames 418 that exclude the first set of image frames 414 and the second set of image frames 416 may be combined with the updated versions 420 of the second set of image frames 416 to form a combined set of image frames (such as image frames for a current period in time). The combined set of image frames may then be used to determine the vehicle control instructions 424. In certain implementations, a top view segmentation map 422 may be determined based on the combined set of image frames, and may be used to determine the vehicle control instructions 424. For example, a top view model 412 may be configured to determine a top view segmentation map 422 based on feature vectors for received images. In certain implementations, the method 600 further includes training the top view model 412 to maintain consistency between (i) features generated based on non-corrupted image frames 404 and (ii) features generated for the updated versions 420.

In certain implementations, the method 600 may further include, prior to determining the first set of image frames 414, training the first machine learning model 406 based on a one-hot encoding of known corrupted image frames 404 within a training dataset. In certain implementations, the known corrupted image frames 404 may be generated, such as by blurring, obscuring, or removing image frames 404. Training the first machine learning model 406 may include training the MLP layer 506 (such as by adjusting one or more features, nodes, or other aspects of the MLP layer 506). Additionally or alternatively, training the first machine learning model 406 may include adjusting the sigmoid function 508 (such as the cutoff threshold for identifying a corrupted image frame, one or more parameters of how the sigmoid function 508 computes output values, and the like). In certain implementations, the method 600 further includes, prior to determining the second set of image frames 416, training the second machine learning model 408 based on a training dataset containing training image frames 404 that are known to be partially occluded. In certain implementations, the training data set for the second machine learning model 408 may contain training image frames that were created to be partially occluded. In certain implementations, the method 600 may further include training the third machine learning model 410 based on comparisons between updated versions 420 of the known occluded image frames and original, non-occluded versions of those image frames. For example, where the known occluded image frames 404 are manually created by including otherwise clear image frames, the original clear image frames may be compared to the updated versions 420 determined by the third machine learning model 410, and the third machine learning model 410 may be updated as noted above based on differences between the original clear image frames 404 and the updated versions 420. In certain implementations, two or more of the first machine learning mode, the second machine learning model 408, and the third machine learning model 410 may be trained in parallel.

It is noted that one or more blocks (or operations) described with reference to FIG. 5 may be combined with one or more blocks (or operations) described with reference to another of the figures. For example, one or more blocks (or operations) of FIG. 5 may be combined with one or more blocks (or operations) of FIG. 1-3. As another example, one or more blocks associated with FIG. 5 may be combined with one or more blocks associated with FIG. 4.

In one or more aspects, techniques for supporting vehicular operations may include additional aspects, such as any single aspect or any combination of aspects described below or in connection with one or more other processes or devices described elsewhere herein. A first aspect includes a method for image processing for use in a vehicle assistance system is provided that includes receiving a plurality of image frames. The method also includes determining, from among the plurality of image frames, a first set of image frames that are corrupted. The method also includes identifying, from among the plurality of image frames, a second set of image frames that are partially occluded. The method also includes determining fused feature vectors based on the second set of image frames and a third set of image frames, wherein the third set of image frames excludes the first set of image frames and the second set of image frames. The method also includes determining, based on the fused feature vectors, updated versions of at least a subset of the first set of image frames and the second set of image frames. The method also includes determining a top view segmentation map based on the updated versions, wherein the top view segmentation map is determined to maintain consistency between non-corrupted image frames and the updated versions. The method also includes determining vehicle control instructions based on the top view segmentation map.

In a second aspect, in combination with the first aspect, the first set of image frames are determined using a first machine learning model.

In a third aspect, in combination with the second aspect, the first machine learning model determines the first set of image frames based on predicted probabilities that the first set of image frames are corrupted.

In a fourth aspect, in combination with the third aspect, the first machine learning model includes a multi-layer perceptron (MLP) layer configured to determine the predicted probabilities.

In a fifth aspect, in combination with one or more of the second aspect through the fourth aspect, the first machine learning model is further configured to apply a separable convolution operation to each of the first set of image frames.

In a sixth aspect, in combination with one or more of the second aspect through the fifth aspect, the method includes, prior to determining the first set of image frames, training the first machine learning model based on a one-hot encoding of known corrupted image frames within a training dataset.

In a seventh aspect, in combination with one or more of the first aspect through the sixth aspect, the second set of image frames are determined using a second machine learning model.

In an eighth aspect, in combination with the seventh aspect, the second machine learning model performs a relative convolution operation that applies a bias value to pixel values.

In a ninth aspect, in combination with the eighth aspect, the bias value is determined based on pixel values within a convolution window of the relative convolution operation.

In a tenth aspect, in combination with one or more of the seventh aspect through the ninth aspect, the method includes, prior to determining the second set of image frames, training the second machine learning model based on a training dataset containing training image frames that are known to be partially occluded.

In an eleventh aspect, in combination with one or more of the first aspect through the tenth aspect, the updated versions are determined by a third machine learning model that receives the fused feature vectors.

In a twelfth aspect, in combination with one or more of the first aspect through the eleventh aspect, the vehicle control instructions are determined based on the top view segmentation map.

In a thirteenth aspect, in combination with the twelfth aspect, the top view segmentation map is determined using a top view model, and the method may further include training the top view model to maintain may include between (i) feature vectors for on non-corrupted image frames and (ii) feature vectors for the updated versions.

In a fifteenth aspect, in combination with the thirteenth aspect, training the top view model includes determining a consistency measure between feature vectors for non-corrupted image frames and feature vectors for the updated versions. The consistency measure comprises at least one of an L1 loss measure between feature vectors for non-corrupted image frames and feature vectors for the updated versions, an L2 loss measure between feature vectors for non-corrupted image frames and feature vectors for the updated versions, a KL divergence between feature vectors for non-corrupted image frames and feature vectors for the updated versions, or a combination thereof.

A fifteenth aspect includes an apparatus that includes a memory storing processor-readable code and at least one processor coupled to the memory. The at least one processor may be configured to execute the processor-readable code to cause the at least one processor to perform operations that include receiving a plurality of image frames. The operations also include determining, from among the plurality of image frames, a first set of image frames that are corrupted and identifying, from among the plurality of image frames, a second set of image frames that are partially occluded. The operations also include determining fused feature vectors based on the second set of image frames and a third set of image frames, wherein the third set of image frames excludes the first set of image frames and the second set of image frames. The operations also include determining, based on the fused feature vectors, updated versions of at least a subset of the first set of image frames and the second set of image frames. The operations also include determining a top view segmentation map based on the updated versions, wherein the top view segmentation map is determined to maintain consistency between non-corrupted image frames and the updated versions. The operations also include determining vehicle control instructions based on the top view segmentation map. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a sixteenth aspect, in combination with the fifteenth aspect, the first set of image frames are determined using a first machine learning model.

In a seventeenth aspect, in combination with the sixteenth aspect, the first machine learning model determines the first set of image frames based on predicted probabilities that the first set of image frames are corrupted.

In an eighteenth aspect, in combination with the seventeenth aspect, the first machine learning model includes a multi-layer perceptron (MLP) layer configured to determine the predicted probabilities.

In a nineteenth aspect, in combination with one or more of the sixteenth aspect through the eighteenth aspect, the operations further may include, prior to determining the first set of image frames, training the first machine learning model based on a one-hot encoding of known corrupted image frames within a training dataset.

In a twentieth aspect, in combination with one or more of the fifteenth aspect through the nineteenth aspect, the second set of image frames are determined using a second machine learning model.

In a twenty-first aspect, in combination with the twentieth aspect, the second machine learning model performs a relative convolution operation that applies a bias value to pixel values.

In a twenty-second aspect, in combination with one or more of the twentieth aspect through the twenty-first aspect, the operations further include, prior to determining the second set of image frames, training the second machine learning model based on a training dataset containing training image frames that are known to be partially occluded.

In a twenty-third aspect, in combination with one or more of the fifteenth aspect through the twenty-second aspect, the operations further include determining a top view segmentation map based on the updated versions, where the vehicle control instructions are determined based on the top view segmentation map.

In a twenty-fourth aspect, in combination with the twenty-third aspect, the top view segmentation map is determined using a top view model, and the operations further may include training the top view model to maintain may include between (i) feature vectors for on non-corrupted image frames and (ii) feature vectors for the updated versions.

A twenty-fifth aspect includes a non-transitory computer-readable medium storing instructions that, when executed by a processor, cause the processor to perform operations that include receiving a plurality of image frames. The operations also include determining, from among the plurality of image frames, a first set of image frames that are corrupted and identifying, from among the plurality of image frames, a second set of image frames that are partially occluded. The operations also include determining fused feature vectors based on the second set of image frames and a third set of image frames, wherein the third set of image frames excludes the first set of image frames and the second set of image frames. The operations also include determining, based on the fused feature vectors, updated versions of at least a subset of the first set of image frames and the second set of image frames. The operations also include determining a top view segmentation map based on the updated versions, wherein the top view segmentation map is determined to maintain consistency between non-corrupted image frames and the updated versions. The operations also include determining vehicle control instructions based on the top view segmentation map.

In a twenty-sixth aspect, in combination with the twenty-fifth aspect, the first set of image frames are determined using a first machine learning model that includes a multi-layer perceptron (MLP) layer configured to determine predicted probabilities that the first set of image frames are corrupted.

In a twenty-seventh aspect, in combination with one or more of the twenty-fifth aspect through the twenty-sixth aspect, the second set of image frames are determined using a second machine learning model that performs a relative convolution operation that applies a bias value to pixel values.

A twenty-eighth aspect includes a vehicle that includes a memory storing processor-readable code and at least one processor coupled to the memory. The at least one processor configured to execute the processor-readable code to cause the at least one processor to perform operations that include receiving a plurality of image frames. The operations also include determining, from among the plurality of image frames, a first set of image frames that are corrupted and identifying, from among the plurality of image frames, a second set of image frames that are partially occluded. The operations also include determining fused feature vectors based on the second set of image frames and a third set of image frames, wherein the third set of image frames excludes the first set of image frames and the second set of image frames. The operations also include determining, based on the fused feature vectors, updated versions of at least a subset of the first set of image frames and the second set of image frames. The operations also include determining a top view segmentation map based on the updated versions, wherein the top view segmentation map is determined to maintain consistency between non-corrupted image frames and the updated versions. The operations also include determining vehicle control instructions based on the top view segmentation map.

In a twenty-ninth aspect, in combination with the twenty-eighth aspect, the first set of image frames are determined using a first machine learning model that includes a multi-layer perceptron (MLP) layer configured to determine predicted probabilities that the first set of image frames are corrupted.

In a thirtieth aspect, in combination with one or more of the twenty-eighth through the twenty-ninth aspect, the second set of image frames are determined using a second machine learning model that performs a relative convolution operation that applies a bias value to pixel values.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing for use in a vehicle assistance system, comprising:
   receiving a plurality of image frames;
   determining, from among the plurality of image frames, a first set of image frames that are corrupted;

identifying, from among the plurality of image frames, a second set of image frames that are partially occluded;
   determining fused feature vectors based on the second set of image frames and a third set of image frames, wherein the third set of image frames excludes the first set of image frames and the second set of image frames;
   determining, based on the fused feature vectors, updated versions of at least a subset of the first set of image frames and the second set of image frames;
   determining a top view segmentation map based on the updated versions, wherein the top view segmentation map is determined to maintain consistency between non-corrupted image frames and the updated versions, wherein the top view segmentation map is determined using a top view model, and the method further comprises training the top view model to maintain consistency between feature vectors for the non-corrupted image frames and feature vectors for the updated versions, wherein training the top view model includes determining a consistency measure between feature vectors for the non-corrupted image frames and feature vectors for the updated versions; and
   determining vehicle control instructions based on the top view segmentation map, wherein the consistency measure comprises at least one of:
      an L1 loss measure between feature vectors for the non-corrupted image frames and feature vectors for the updated versions,
      an L2 loss measure between feature vectors for the non-corrupted image frames and feature vectors for the updated versions,
      a KL divergence between feature vectors for the non-corrupted image frames and feature vectors for the updated versions, or
      a combination thereof.

2. The method of claim 1, wherein the first set of image frames are determined using a first machine learning model.

3. The method of claim 2, wherein the first machine learning model determines the first set of image frames based on predicted probabilities that the first set of image frames are corrupted.

4. The method of claim 3, wherein the first machine learning model includes a multi-layer perceptron (MLP) layer configured to determine the predicted probabilities.

5. The method of claim 2, wherein the first machine learning model is further configured to apply a separable convolution operation to each of the first set of image frames.

6. The method of claim 2, further comprising, prior to determining the first set of image frames, training the first machine learning model based on a one-hot encoding of known corrupted image frames within a training dataset.

7. The method of claim 1, wherein the second set of image frames are determined using a second machine learning model.

8. The method of claim 7, wherein the second machine learning model performs a relative convolution operation that applies a bias value to pixel values.

9. The method of claim 8, wherein the bias value is determined based on pixel values within a convolution window of the relative convolution operation.

10. The method of claim 7, further comprising, prior to determining the second set of image frames, training the second machine learning model based on a training dataset containing training image frames that are known to be partially occluded.

11. The method of claim 1, wherein the updated versions are determined by a third machine learning model that receives the fused feature vectors.

12. An apparatus, comprising:

a memory storing processor-readable code; and at least one processor coupled to the memory, the at least one processor configured to execute the processor-readable code to cause the at least one processor to perform operations including:

receiving a plurality of image frames;

determining, from among the plurality of image frames, a first set of image frames that are corrupted;

identifying, from among the plurality of image frames, a second set of image frames that are partially occluded;

determining fused feature vectors based on the second set of image frames and a third set of image frames, wherein the third set of image frames excludes the first set of image frames and the second set of image frames;

determining, based on the fused feature vectors, updated versions of at least a subset of the first set of image frames and the second set of image frames;

determining a top view segmentation map based on the updated versions, wherein the top view segmentation map is determined to maintain consistency between non-corrupted image frames and the updated versions, wherein the top view segmentation map is determined using a top view model, and the operations further comprise training the top view model to maintain consistency between feature vectors for the non-corrupted image frames and feature vectors for the updated versions, wherein training the top view model includes determining a consistency measure between feature vectors for the non-corrupted image frames and feature vectors for the updated versions; and determining vehicle control instructions based on the top view segmentation map, wherein the consistency measure comprises at least one of:

an L1 loss measure between feature vectors for the non-corrupted image frames and feature vectors for the updated versions, an L2 loss measure between feature vectors for the non-corrupted image frames and feature vectors for the updated versions, a KL divergence between feature vectors for the non-corrupted image frames and feature vectors for the updated versions, or a combination thereof.

13. The apparatus of claim 12, wherein the first set of image frames are determined using a first machine learning model.

14. The apparatus of claim 13, wherein the first machine learning model determines the first set of image frames based on predicted probabilities that the first set of image frames are corrupted.

15. The apparatus of claim 14, wherein the first machine learning model includes a multi-layer perceptron (MLP) layer configured to determine the predicted probabilities.

16. The apparatus of claim 13, wherein the operations further comprise, prior to determining the first set of image frames, training the first machine learning model based on a one-hot encoding of known corrupted image frames within a training dataset.

17. The apparatus of claim 12, wherein the second set of image frames are determined using a second machine learning model.

18. The apparatus of claim 17, wherein the second machine learning model performs a relative convolution operation that applies a bias value to pixel values.

19. The apparatus of claim 17, wherein the operations further comprise, prior to determining the second set of image frames, training the second machine learning model based on a training dataset containing training image frames that are known to be partially occluded.

20. A non-transitory computer-readable medium storing instructions that, when executed by a processor, cause the processor to perform operations comprising:

receiving a plurality of image frames;

determining, from among the plurality of image frames, a first set of image frames that are corrupted;

identifying, from among the plurality of image frames, a second set of image frames that are partially occluded;

determining fused feature vectors based on the second set of image frames and a third set of image frames, wherein the third set of image frames excludes the first set of image frames and the second set of image frames;

determining, based on the fused feature vectors, updated versions of at least a subset of the first set of image frames and the second set of image frames;

determining a top view segmentation map based on the updated versions, wherein the top view segmentation map is determined to maintain consistency between non-corrupted image frames and the updated versions, wherein the top view segmentation map is determined using a top view model, and wherein the operations further comprise training the top view model to maintain consistency between feature vectors for the non-corrupted image frames and feature vectors for the updated versions, wherein training the top view model includes determining a consistency measure between feature vectors for the non-corrupted image frames and feature vectors for the updated versions; and determining vehicle control instructions based on the top view segmentation map, wherein the consistency measure comprises at least one of:

an L1 loss measure between feature vectors for the non-corrupted image frames and feature vectors for the updated versions, an L2 loss measure between feature vectors for the non-corrupted image frames and feature vectors for the updated versions, a KL divergence between feature vectors for the non-corrupted image frames and feature vectors for the updated versions, or a combination thereof.

21. The non-transitory computer-readable medium of claim 20, wherein the first set of image frames are determined using a first machine learning model that includes a multi-layer perceptron (MLP) layer configured to determine predicted probabilities that the first set of image frames are corrupted.

22. The non-transitory computer-readable medium of claim 20, wherein the second set of image frames are determined using a second machine learning model that performs a relative convolution operation that applies a bias value to pixel values.

23. A vehicle comprising:

a memory storing processor-readable code; and at least one processor coupled to the memory, the at least one processor configured to execute the processor-readable code to cause the at least one processor to perform operations including:

receiving a plurality of image frames;

determining, from among the plurality of image frames, a first set of image frames that are corrupted;

identifying, from among the plurality of image frames, a second set of image frames that are partially occluded;

determining fused feature vectors based on the second set of image frames and a third set of image frames, wherein the third set of image frames excludes the first set of image frames and the second set of image frames;

determining, based on the fused feature vectors, updated versions of at least a subset of the first set of image frames and the second set of image frames;

determining a top view segmentation map based on the updated versions, wherein the top view segmentation map is determined to maintain consistency between non-corrupted image frames and the updated versions, wherein the top view segmentation map is determined using a top view model, and wherein the operations further comprise training the top view model to maintain consistency between feature vectors for the non-corrupted image frames and feature vectors for the updated versions, wherein training the top view model includes determining a consistency measure between feature vectors for the non-corrupted image frames and feature vectors for the updated versions; and determining vehicle control instructions based on the top view segmentation map, wherein the consistency measure comprises at least one of:

an L1 loss measure between feature vectors for the non-corrupted image frames and feature vectors for the updated versions, an L2 loss measure between feature vectors for the non-corrupted image frames and feature vectors for the updated versions, a KL divergence between feature vectors for the non-corrupted image frames and feature vectors for the updated versions, or a combination thereof.

24. The vehicle of claim 23, wherein the first set of image frames are determined using a first machine learning model that includes a multi-layer perceptron (MLP) layer configured to determine predicted probabilities that the first set of image frames are corrupted.

25. The vehicle of claim 23, wherein the second set of image frames are determined using a second machine learning model that performs a relative convolution operation that applies a bias value to pixel values.

\* \* \* \* \*